United States Patent [19]

Hirs

[11] 4,091,830

[45] May 30, 1978

[54] METHOD AND APPARATUS FOR REMOVING WATER FROM OIL STORAGE TANK

[76] Inventor: Gene Hirs, 6865 Meadow Lake Dr., Birmingham, Mich. 48010

[21] Appl. No.: 769,985

[22] Filed: Feb. 18, 1977

[51] Int. Cl.$^2$ .............................................. B01D 13/00
[52] U.S. Cl. ....................................... 137/2; 137/172; 210/500 R
[58] Field of Search ....................... 137/172, 1, 2, 197, 137/199; 210/289, 489, 493 R, 493 B, 500 R

[56] References Cited

U.S. PATENT DOCUMENTS

| | | | |
|---|---|---|---|
| 3,502,297 | 3/1970 | Wardrup | 251/51.1 X |
| 3,750,688 | 8/1973 | Hall | 137/2 |
| 3,958,590 | 5/1976 | Hall | 137/172 |

*Primary Examiner*—Alan Cohan

[57] ABSTRACT

A method and apparatus are disclosed for draining water from an oil storage tank. The apparatus includes a first, generally horizontal flow line communicating with both the bottom of the tank and a second generally vertical flow line. A housing structure is connected to the top of the second flow line for housing an oil imbiber material which passes water but which expands upon being contacted by oil to block further liquid flow. The housing structure includes an inlet at its bottom receiving the second flow line, an internal chamber receiving the imbiber material, a removal cap at its top to facilitate replacement of the imbiber material, and a discharge outlet through a side wall at a position above the inlet. In the method, water flows from the storage tank, through the first and second flow lines, into the housing structure, through the imbiber material and out of the housing structure. When essentially all of the water is removed from the oil tank, oil flows through the same path until the imbiber material expands to a sufficient extent to block further flow.

10 Claims, 2 Drawing Figures

METHOD AND APPARATUS FOR REMOVING WATER FROM OIL STORAGE TANK

BACKGROUND OF THE INVENTION

1. Field of the Invention

The present invention relates to a method and apparatus for removing water from a storage facility for organic liquids.

2. The Prior Art

Various uses have been developed for so-called "polymer imbiber" materials which expand when contacted by petroleum-based liquids, such materials being sold by The Dow Chemical Company.

For example, U.S. Pat. No. 3,750,688 to Hall, incorporated by reference, discloses a valve which includes such an imbiber material that freely passes water but expands when contacted by oil. Notably, however, the housing structure in the Hall patent does not provide for the removal of the imbiber material for a subsequent valving cycle.

Additionally, it has been suggested to use imbiber materials in a valving structure for drawing off water for bulk hydrocarbon storage tanks. However, previous designs of such valving structures have been undesirable for various reasons, including the allowance of excessive oil drain-off and spillage during replacement of the imbiber materials.

SUMMARY OF THE INVENTION

These prior art problems, disadvantages and shortcomings are overcome in the present invention which includes an improved structure for housing imbiber material in a valving arrangement which facilitates the removal of the imbiber material without excessive oil spillage. The improved housing includes a cup-shaped base which includes a bottom member, an inlet thorugh the bottom, an annular side wall integral with the bottom, and an outlet through the side wall. A removable cap is retained on top of the side wall by a releasable means which permit ready disassembly of the cap to replace the organic imbiber material.

More preferably, the bottom of the base is downwardly dished and includes a peripheral locating surface between the bottom and side wall to receive a sealing ring upon which the organic imbiber material may be positioned. Additionally, an outwardly directed peripheral flange is integral with the top of the side wall, with a peripheral bead extending upwardly on the flange for retaining a sealing ring positioned between the flange and the cap.

The improved housing is preferably used in a flow system which includes a generally horizontal, first flow line communicating with the interior of an oil storage tank. A valve in the first flow line selectively accommodates liquid flow to a generally vertical, second flow line to which the housing structure is connected.

In the method, the valve in the horizontal flow line is opened, permitting water at the bottom of the oil storage tank to flow generally horizontally through the first flow line and then generally vertically through the second flow line into the housing, through the imbiber material, and then out of the housing. When essentially all the water is removed from the tank, oil then flows through the same path, but is imbibed by the polymer material in the housing to effect a positive valving effect.

Accordingly, the housing and valving arrangement of the present invention facilitates the removal and replacement of valving imbiber material without unnecessary and undesirable oil spillage during such an operation. These and other meritorious features and advantages of the present invention will be more fully appreciated from the following detailed description and the appended claims.

DETAILED DESCRIPTION OF THE PREFERRED EMBODIMENT

Figure 1:
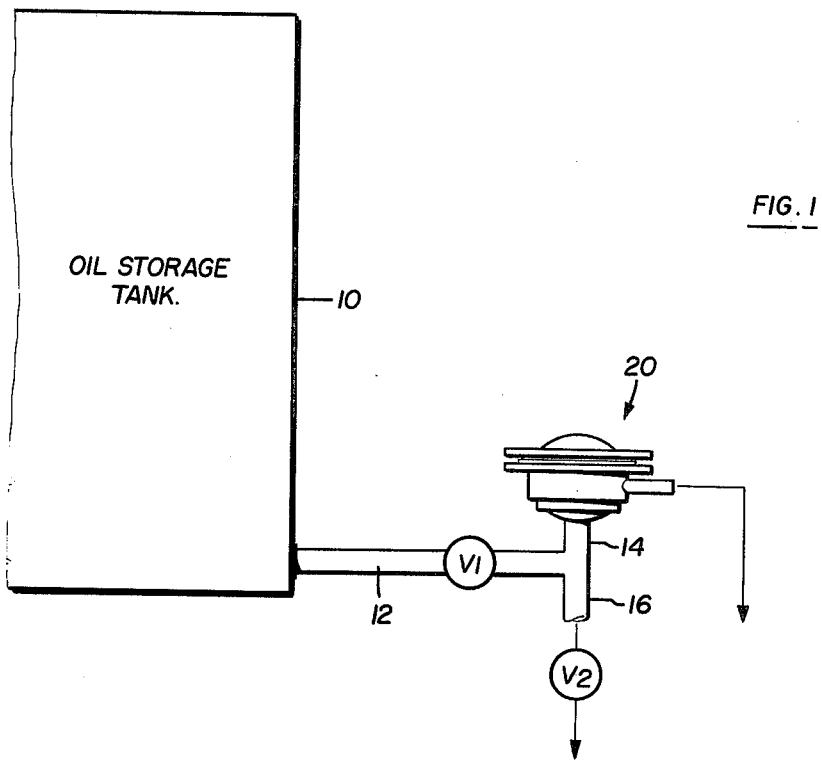
FIG. 1 is a schematic illustration of the overall flow system and imbiber housing of the present invention.

The present invention relates to an overall flow system for removing water from an oil storage tank and to a housing structure in that flow system for retaining polymer imbiber material. U.S. Pat. No. 3,750,688 to Hall is incorporated by reference to disclose the particular polymer imbiber materials which may be used in the present invention. It is contemplated by the present invention that the imbiber material, shown by reference numeral 60, will be in the form of a disc. However, other shapes could be used, with approximate changes in shape likewise being made to the housing structure.

The overall flow system is illustrated in FIG. 1 as including an oil storage tank 10, a generally horizontal flow line 12, a valve V1 in flow line 12, a pair of segments 14 and 16 of a vertical flow line, a valve V2 in segment 16, and the housing structure 20 of the present invention. Horizontal flow line 12 communicates with the interior of the oil storage tank at about the tank bottom. As will be appreciated, oil floats on top of water so that any water which may accumulate in tank 10 may be drained off through flow line 12. Both vertical flow line segments 14 and 16 are in fluid communication with flow line 12, with the housing structure 20 being mounted to the top of segment 14. Valves V1 and V2 are of conventional design to accommodate the selective closing and opening of flow lines 12 and 16 in a manner to be more fully described below.

Figure 2:
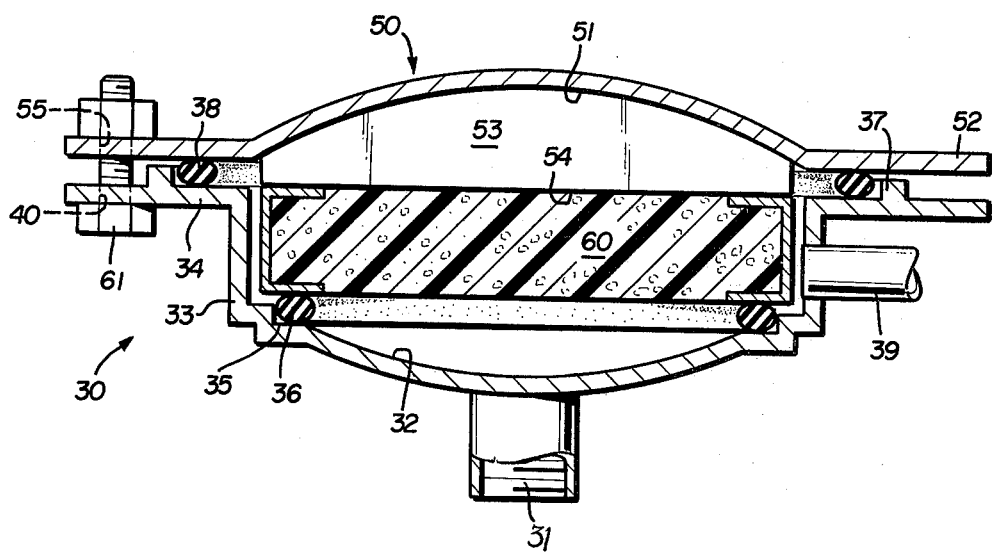
FIG. 2 is a cross-sectional, side elevational view of the housing of the present invention.

As shown in FIG. 2, the housing structure includes a base 30 and a cap 50. The base includes a threaded coupling 31 for interconnection with vertical flow line segment 14. A dished bottom 32 openeds upwardly from the coupling 31 and is integral with an annular side wall 33, from which a peripheral flange 34 projects. A step 35 in the base between the dished bottom 32 and the side wall 33 provides a peripheral locating surface to receive a sealing O-ring 36. Likewise, an upwardly projecting, circumferential bead 37 is provided on the peripheral flange 34 to locate a second sealing O-ring 38 between the flange 34 and the cap 50. An outlet or discharge 39 extends radially outwardly through the side wall 33 to accommodate the flow of water from the housing.

The cap 50 includes an upwardly dished central portion 51 which blends into an outer peripheral flange 52 overlying the flange 34 of the base. Ribs 53 (only one being shown) extend downwardly from the dished region 51 to provide abutment surfaces 54 which engage the imbiber material 60.

Mating openings 40 and 55 respectively in the base and the cap receive a bolt 61 to retain the cap to the base. Preferably, three such openings and bolts will be utilized. As shown, when the nut on bolt 61 is tightened, two seals are established. The peripheral flange 52 on the cap compresses O-ring 38 to form a seal between the base and the cap. Second, abutment surface 54 displaces the imbiber material disc 60 downwardly to compress the O-ring 36, so that fluid entering the housing must flow through the imbiber material before exiting through discharge 39.

In the overall operation of removing water from the bottom of an oil storage tank, the first step includes opening valve V1. Water flows through the essentially horizontal flow line 12 and then vertically upwardly through flow line segment 14 into the housing 20, since valve V2 is closed during this phase of operation. At the housing 20, water flows through inlet coupling 31, through the imbiber material 60 and then out of discharge 39. When all of the water is removed from the storage tank, oil then flows through the same path. Because of its characteristics, the imbiber material begins to expand when contacted by the oil. This expansion continues until the material closes off all the interstices between the individual polymer beads, effecting a positive shut-off to restrict further oil flow. Valve V1 is then shut-off, and valve V2 is opened to drain oil out of vertical flow line segments 14 and 16 and out of the housing. The cap 50 is then removed to enable the removal and replacement of the imbiber material. Finally, the cap is re-secured and valve V2 is closed.

It will be understood that the foregoing description is exemplary in nature. For example, the housing is shown as being metal, but could alternatively be formed of any other suitable material.

Having therefore completely and sufficiently disclosed my invention, I now claim:

1. A valve, comprising a housing defining an interior cavity;
   an inlet and outlet in the housing communicating with the cavity;
   a water permeable body of polymer material in the cavity, the polymer being expandable when contacted with organic liquid to an extent sufficient to prevent fluid communication between the inlet and outlet;
   the improvement of:
   the inlet being at the bottom of the housing as oriented for use, the outlet being at a position in the housing above the inlet, and the housing including a removal cap at its top, as oriented for use, with the cap overlying the polymer material and being secured to the remainder of the housing by a plurality of bolts, such that upon removal of the cap the polymer may be vertically removed and replaced and then the cap may be re-secured to the housing by the bolts.

2. A metal housing for organic imbiber material in a valving arrangement which accommodates the flow of water but stops the flow of organic liquids, comprising:
   a cup-shaped base including a downwardly dished bottom, an inlet through the dished bottom and an annular side wall integral with the dished bottom defining a chamber for receiving the organic imbiber material, a peripheral locating surface between the bottom and the side wall adapted to receive a sealing ring upon which the organic imbiber material may be positioned, an outwardly directed peripheral flange integral with the top of the side wall, and a circumferential bead on the flange for retaining a sealing ring;
   a cap including an upwardly dished top overlying the chamber in the base, ribs projecting downwardly from the top to engage the organic imbiber material, and an outwardly directed, peripheral flange overlying the flange of the base; and
   releasable means securing the cap to the base to accommodate the insertion and removal of the organic imbiber material.

3. A valving arrangement for use in combination with an oil storage tank to accommodate the removal of water which was inadvertently accumulated in the tank, comprising:
   a generally horizontal, first flow line communicating with the interior of the tank at about the tank bottom;
   a valve in the first flow line for selectively accommodating liquid flow therethrough;
   a generally vertical, second flow line communicating with the first line and including separate upper and lower segments respectively extending upwardly and downwardly from the first flow line;
   a valve in the lower segment of the second flow line for selectively accommodating liquid flow therethrough; and
   a housing communicating with the upper segment of the second flow line; the housing including a generally cup-shaped base including an inlet in its bottom receiving the upper end of said upper segment, the base defining a chamber for receiving organic imbiber material which is capable of passing water but which expands upon the contact with organic liquids, a discharge opening in the base above the inlet, and a cap releasably secured to the top of the base and overlying the chamber to accommodate the replacement of the organic imbiber material.

4. The valving arrangement as defined in claim 3, wherein the housing is further characterized by the base including a downwardly dished bottom, a coupling integral with the bottom receiving said upper segment, an annular side wall integral with the dished bottom, and an outwardly directed, peripheral flange integral with the top of the side wall.

5. The valving arrangement as defined in claim 4, wherein the housing is further characterized by the cap including a central segment overlying the chamber and an outwardly directed flange overlying the base flange, and the two flanges including mating openings receiving clamping means.

6. The valving arrangement as defined in claim 5, characterized by the housing base further including a circumferential bead on the outwardly directed flange for locating an O-ring which is clamped between the two flanges for sealing the cap and base.

7. The valving arrangement as defined in claim 6, characterized by the housing further including an annular locating surface between the dished bottom and the annular side wall of the base, a second O-ring seated against the locating surface, and the cap including an abutment surface overlying and engaging the imbiber material such that the imbiber material is sealed against the second O-ring to prevent liquid flow from the inlet to the discharge without passing through the imbiber material.

8. The valving arrangement as defined in claim 7, characterized by the central segment of the cap being upwardly dished and by the abutment surface on the cap being formed by a plurality of ribs extending downwardly from the central cap segment.

9. In a method of removing water from an oil storage tank or the like, the steps of:
   (1) removing water from the bottom of the oil storage tank with oil floating on top of the water, by flowing the water (a) from the bottom of the tank, (b) generally horizontally through a first flow line, (c) then generally vertically upwardly through a second flow line into an inlet in a housing, (d) then through an oil imbiber material in the housing, and (e) then generally horizontally through an outlet in the housing;
   (2) after the performance of Step (1), flowing oil in the same flow path set forth in subparagraphs (a)–(e) of Step (1), with the imbiber material expanding in response to contact by the oil; and
   (3) thereafter, terminating the flow of oil through said flow path in response to expansion of said imbiber material.

10. The method as defined in claim 9, further including the steps of:
   (4) closing a first valve in the first flow line to prevent oil flow from the tank;
   (5) opening a second valve in the second flow line and gravitationally draining oil from the second flow line;
   (6) upwardly removing the expanded material from the housing; and
   (7) downwardly placing fresh imbiber material within the housing.

* * * * *